United States Patent
Main

[11] 3,909,065
[45] Sept. 30, 1975

[54] VEHICLE WHEEL

[75] Inventor: John A. Main, East Lansing, Mich.

[73] Assignee: Motor Wheel Corporation, Lansing, Mich.

[22] Filed: Oct. 29, 1973

[21] Appl. No.: 410,806

[52] U.S. Cl............................ 301/63 DD; 301/63 R
[51] Int. Cl............................................. B60b 3/08
[58] Field of Search........ 301/6 WB, 63 DD, 64 SH, 301/65, 63 R, 37 P; 295/7, 23; 152/DIG. 10, DIG. 16

[56] References Cited
UNITED STATES PATENTS

| 435,672 | 9/1890 | Allen | 295/1 |
| 1,562,696 | 11/1925 | Garriott | 301/63 D |
| 3,484,137 | 12/1969 | Stewart | 301/65 |
| 3,669,501 | 6/1972 | Derleth | 301/63 R |

FOREIGN PATENTS OR APPLICATIONS

| 1,081,916 | 5/1960 | Germany | 295/7 |
| 35,828 | 11/1929 | France | 301/63 DD |
| 269,024 | 7/1966 | Australia | 301/63 DD |
| 249,789 | 4/1926 | United Kingdom | 301/63 DD |

Primary Examiner—M. Henson Wood, Jr.
Assistant Examiner—Reinhard J. Eisenzopf
Attorney, Agent, or Firm—Barnes, Kisselle, Raisch & Choate

[57] ABSTRACT

A vehicle wheel having rim and disc halves with the outer edges of the disc portions abutting each other and fixed together by a seam weld. The disc portions are axially spaced apart radially inwardly of the seam weld and the space between the disc portions is filled with an adhesive elastomeric material, such as a urethane foam. A bolt hole spacer ring is received between the disc portions and retained therein by the elastomeric material.

11 Claims, 4 Drawing Figures

VEHICLE WHEEL

This invention relates to vehicle wheels and more particularly to a vehicle wheel for a pneumatic tire.

Objects of this invention are to provide a vehicle wheel for a pneumatic tire which is strong, lightweight, durable, inherently balanced, dampens road noise and vibration, and is of economical manufacture and assembly.

These and other objects, features and advantages of this invention will be apparent from the following specification, appended claims, and accompanying drawings in which:

Figure 1:
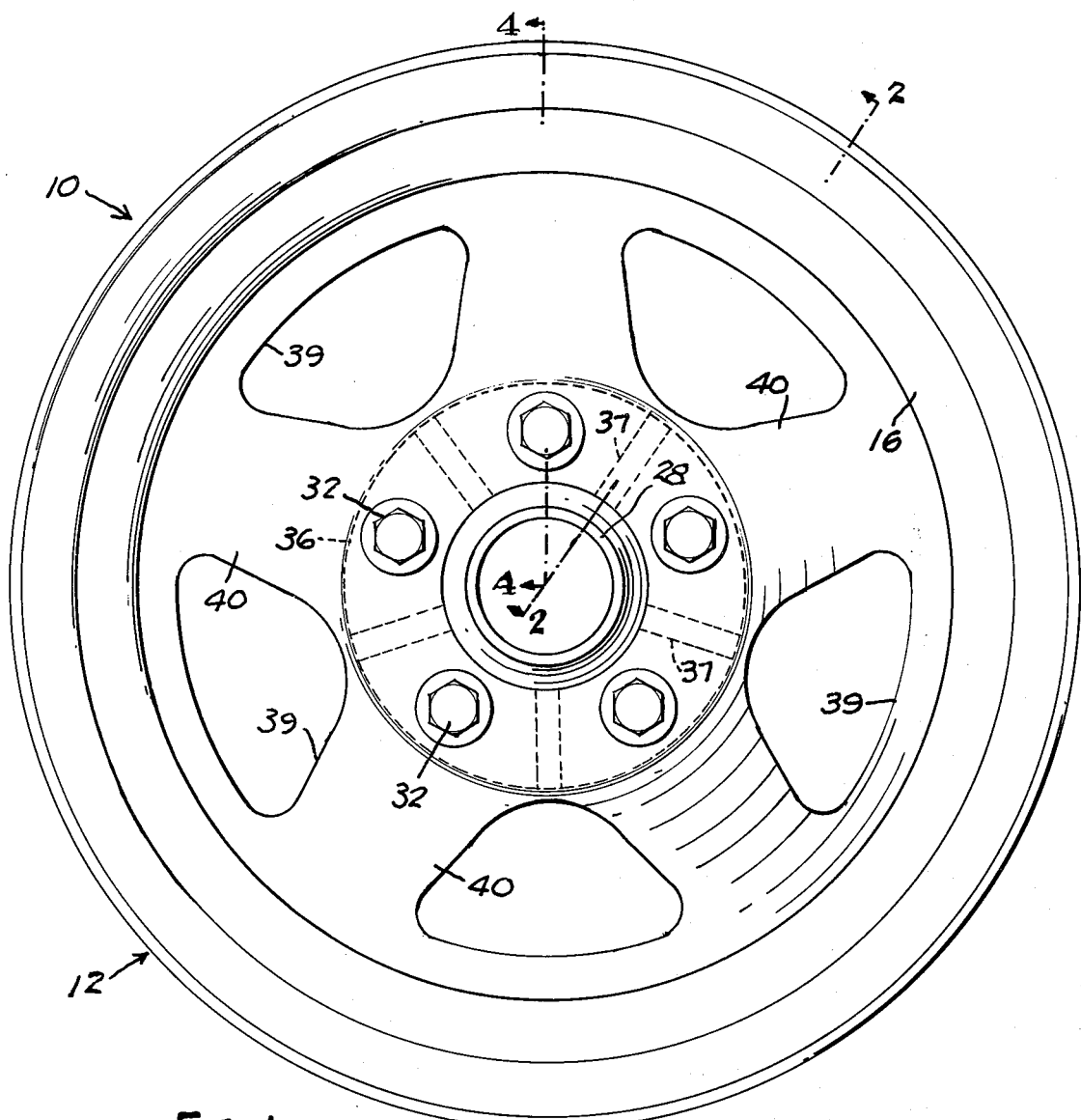
FIG. 1 is a vertical elevational view of the outboard face of a wheel embodying this invention.
Figure 2:
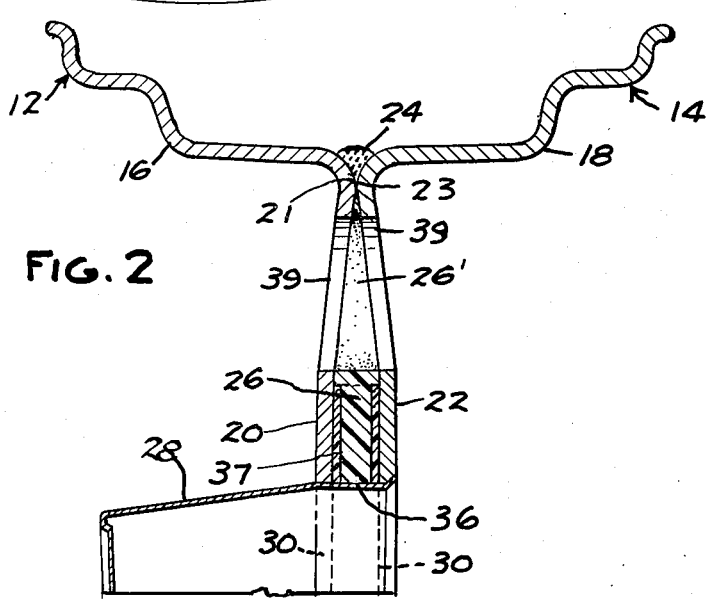
FIG. 2 is a sectional view on line 2—2 of FIG. 1.
Figure 3:
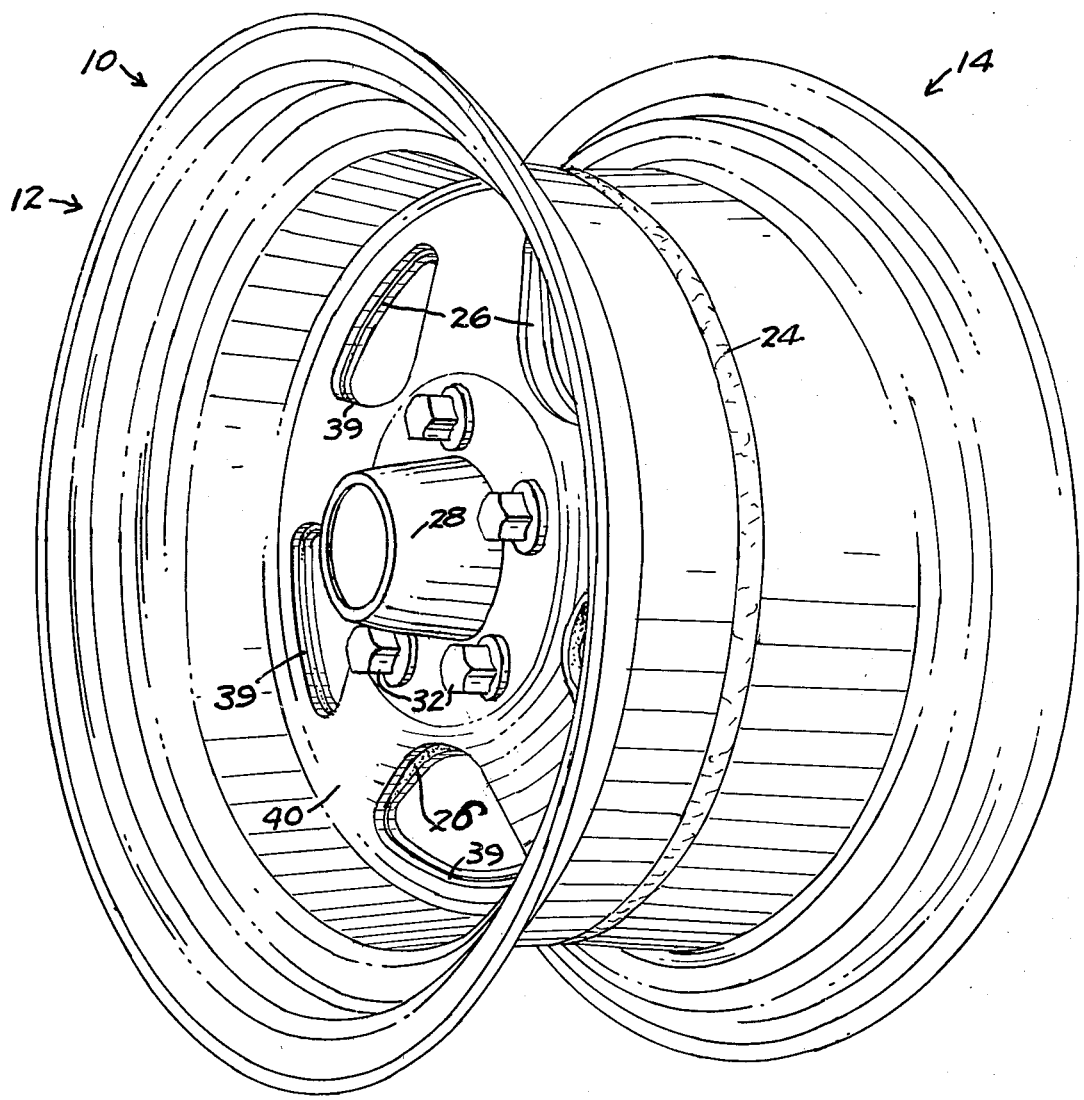
FIG. 3 is a perspective view of the wheel of FIG. 1 looking toward the outboard face thereof.
Figure 4:
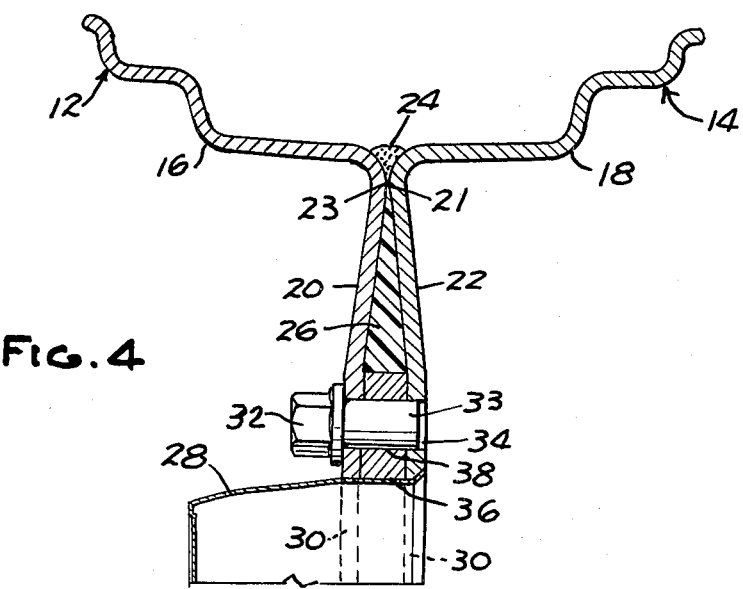
FIG. 4 is a sectional view on line 4—4 of FIG. 1.

Referring in more detail to the drawings, FIGS. 1 and 3 illustrate a vehicle wheel 10 embodying this invention with rim and disc halves 12 and 14 arranged in back-to-back abutment to form a drop center wheel for a tubeless pneumatic tire with a conventional rim cross section as shown in FIGS. 2 and 4. Rim and disc halves 12 and 14 have rim portions 16 and 18 and disc portions 20 and 22 respectively. When assembled, the outer peripheral edges 21 and 23 of disc portions 20 and 22 abut one another and the central portions of the discs taper away from one another so that they are progressively farther axially spaced apart relative to the wheel axis as they approach the center of the wheel, as shown in FIG. 4. Edges 21 and 23 are secured together by a continuous circumferential seam weld 24.

In accordance with one feature of the invention, the annular space between the discs is filled with a cured elastomeric material 26, preferably one having a good adhesive characteristic so as to be self-adhering to the discs when cast and cured in situ. Elastomeric material 26 provides a seal between disc portions 20 and 22 which prevents air (inflating a tubeless pneumatic tire [not shown] received on the rim of the wheel) from escaping to the atmosphere between disc portions 20 and 22 through any holes or porosity defects which may exist initially or later develop in seam weld 24. Elastomeric material 26 also protects the interior surface of the disc portions from attack by corrosive substances. Preferably, elastomeric material 26 is a slightly resilient foam material, such as a high to medium density urethane plastic, such as that disclosed in U.S. Pat. No. 3,756,658. Preferably, wheel rim and disc halves 12 and 14 are made of a strong and lightweight metal, such as wrought sheet magnesium, in which case weld 24 is likewise a magnesium weld metal.

A small hub cap 28 is frictionally received in a central aperture 30 extending axially through discs 20 and 22 of wheel 10. Wheel 10 is secured to a hub with threaded studs thereon (not shown) by a plurality of mounting nuts 32 with integral internally threaded sleeves 33 individually received in circumferentially spaced bolt mounting holes 34 extending axially through disc portions 20 and 22 radially outwardly of hub cap 28. A spacer ring 36 concentric with central aperture 30 extends between and bears against the inside surfaces of disc portions 20 and 22 to prevent the discs from being collapsed toward each other adjacent the bolt mounting holes 34 when the wheel is securely mounted on a vehicle hub by nuts 32. Spacer ring 36 has a plurality of holes 38 therethrough registering with bolt mounting holes 34 for receiving the sleeves 33 of nuts 32 therethrough. The spacer ring is retained in alignment with bolt mounting holes 34 by elastomeric material 26 which bears thereon and adheres thereto.

A plurality of generally triangular shaped vent holes 39 are circumferentially spaced around and extend generally axially through discs 20 and 22 to provide in assembly a lightweight wheel disc or spider with a plurality of spokes 40. Preferably, vent holes 39 are positioned in disc portions 20 and 22 sufficiently radially inwardly of edges 21 and 23 and outwardly of ring 36 so that the elastomeric material 26 completely surrounds each vent hole and is visible when viewing the outboard face of the wheel. This insures that the air sealing and anti-corrosion functions of the elastic material are not impaired. Moreover, this presents a narrow band 26' of elastomeric material extending around the gap between the dual metallic margins of each vent hole which provides a pleasing aesthetic solid sandwich appearance, which may be enhanced by adding a suitable color pigment to the urethane material when making the wheel.

The elastomeric material may be injected between the disc portions 20 and 22 of wheel 10 before vent holes 39 are formed in the disc portions through circumferentially-spaced holes 37 extending generally radially through spacer ring 36. After the elastomeric material is cured, the vent holes 39 may be formed in the wheel so that the elastomeric material surrounds the vent holes as previously explained herein. The cured elastomeric material may extend into holes 37 as shown in FIG. 2 to help retain spacer ring 36 in wheel 10 in alignment with bolt mounting holes 34.

From the foregoing description, it will now be evident that wheels embodying this invention possess an efficient, high-strength geometry, the two halves being securely bonded by welding and yet capable of mounting tubeless pneumatic tires due to the space between the disc portions radially inward of the seam weld being filled with an elastomeric material, which provides a seal preventing leakage of air from the tire to the atmosphere via the seam weld. The two metallic rim and disc halves and the core of an elastomeric material provide a strong, lightweight, and durable sandwich wheel structure which is believed to dampen noise and vibration transmitted from the road to the vehicle on which the wheel is used. The use of integral rim and disc halves provides wheels embodying this invention which may be accurately and economically formed as stampings and are inherently balanced. In addition to sealing the seam weld, the elastomeric adhesive material locates and retains the bolt hole spacer ring between the disc portions, thereby further contributing to the economical structure and assembly of vehicle wheels embodying this invention.

I claim:

1. A vehicle wheel adapted to receive a tubeless pneumatic tire thereon comprising: two metallic wheel halves each being in one piece and having a rim portion and an integral disc portion, each of said wheel halves having an annular edge with said edges disposed in the vicinity of the junction of the rim and disc portions in generally opposed abutting relation, means adjacent said edges fixing said wheel halves together with said rim portions disposed such that a tubeless pneumatic tire may be received thereon, said disc portions each having a central portion, said central portions being disposed in spaced relation axially of the wheel, and a cured elastomeric material adherently secured to both of said disc portions and extending generally circumferentially to fill at least a portion of the space between the inner faces of said disc portions to provide a seal radially inwardly of said edges preventing the escape of air from the interior of a tubeless pneumatic tire received on said rim portions to the atmosphere via said space between the disc portions.

2. The vehicle wheel of claim 1 wherein said means comprises a seam weld extending adjacent said edges, and said elastomeric material extends circumferentially continuously between said disc portions adjacent said seam weld.

3. The vehicle wheel of claim 2 having a plurality of circumferentially spaced mounting holes extending generally axially of the wheel through both of said disc portions, rigid spacer means extending generally axially between and bearing on said disc portions and surrounding said mounting holes, said elastomeric material engaging and retaining said spacer means between said disc portions in alignment with said mounting holes.

4. The vehicle wheel of claim 2 having a plurality of circumferentially spaced vent holes extending generally axially of the wheel through both of said disc portions and through said elastomeric material such that the elastomeric material adjacent the periphery of said vent holes is exposed.

5. The vehicle wheel of claim 4 having a plurality of circumferentially spaced mounting holes extending generally axially of the wheel through both of said disc portions, rigid spacer means extending generally axially between and bearing on said disc portions and surrounding said mounting holes, said elastomeric material engaging and retaining said spacer means between said disc portions in alignment with said mounting holes.

6. The vehicle wheel of claim 1 having a plurality of circumferentially spaced vent holes extending generally axially of the wheel through both of said disc portions and through said elastomeric material such that the elastomeric material adjacent the periphery of said vent holes is exposed.

7. The vehicle wheel of claim 6 wherein at least a portion of the elastomeric material adjacent the generally radial outer periphery of said vent holes is exposed to view from the outboard face of said vehicle wheel.

8. The vehicle wheel of claim 1 having a plurality of circumferentially spaced mounting holes extending generally axially of the wheel through both of said disc portions, rigid spacer means extending generally axially of the wheel between and bearing on said disc portions and surrounding said mounting holes, said elastomeric material engaging and retaining said spacer means between said disc portions in alignment with said mounting holes.

9. The vehicle wheel of claim 8 wherein said rigid spacer means comprises a metallic ring having generally opposed faces bearing on said disc portions adjacent said mounting holes and having holes extending generally axially therethrough in generally coaxial alignment with said mounting holes.

10. The vehicle wheel of claim 9 wherein said metallic ring has a plurality of circumferentially spaced holes extending generally radially therethrough and said cured elastomeric material extends into said last-mentioned holes in said metallic ring to at least in part retain said metallic ring between said disc portions in alignment with said mounting holes.

11. The vehicle wheel of claim 1 wherein each of said metallic wheel halves is made of magnesium, and said elastomeric material engages at least most of the inner surface of each of said disc portions to seal such inner surface from attack by corrosive substances.

* * * * *